United States Patent Office 3,455,725
Patented July 15, 1969

3,455,725
TREATMENT OF INORGANIC OXIDE MATERIALS WITH ORGANOSILICON COMPOUNDS CONTAINING AMINOALKYL GROUPS AND ARTICLES PRODUCED THEREBY
Victor B. Jex, Scarsdale, N.Y., and Donald L. Bailey, Sistersville, W. Va., assignors to Union Carbide Corporation, New York, N.Y., a corporation of New York
No Drawing. Continuation-in-part of applications Ser. No. 483,422, Jan. 21, 1955, Ser. No. 615,482, Oct. 12, 1956, and Ser. No. 77,004, Dec. 20, 1960. This application Sept. 5, 1968, Ser. No. 757,753
Int. Cl. B44d 1/12
U.S. Cl. 117—72
7 Claims

ABSTRACT OF THE DISCLOSURE

An inorganic oxide coated with the interreaction product of an amino containing organopolysiloxane and an organic thermosetting resin possessing groups which react with the amino group of said organopolysiloxane, said amino containing organopolysiloxane having siloxane structural units of the formula

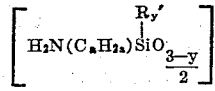

wherein $a$ is an integer selected from the class consisting of 1 and 3 to 10 provided that when $a$ has a value from 3 to 10 the nitrogen atom is separated from the silicon atom by at least 3 carbon atoms of the $C_aH_{2a}$ group, $R'$ contains from one to twelve carbon atoms and is selected from the class consisting of alkyl and aryl groups, and $y$ is an integer having a value from 0 to 1.

---

This application is a continuation-in-part of our copending applications Ser. No. 483,422, filed Jan. 21, 1955 now abandoned; Ser. No. 615,482, filed Oct. 12, 1956 now abandoned and Ser. No. 77,004, filed Dec. 20, 1960 now abandoned.

This invention relates to a process for treating inorganic oxide materials prior to the preparation of composite articles therefrom. More particularly, the invention relates to a process for sizing or finishing inorganic oxide materials suitable for use as fillers prior to the preparation of reinforced plastics therefrom.

Inorganic oxide materials in various forms, such as, for example, fibers, rovings, powders, mats and cloth, have been widely employed as reinforcing means for numerous plastics. Of considerable interest are the glass cloth-reinforced or glass fiber-filled plastic sheets, commonly referred to as "laminates," especially those laminates prepared from fibrous glass materials and thermosetting plastics. Also of interest are similar composite articles, as for example, the asbestos sheet-reinforced or asbestos fiber-filled thermosetting materials as well as the mica-, quartz- and other inorganic oxide-reinforced thermosetting materials wherein the inorganic oxides are in a particulate or pulverulent form. Such reinforced plastics because of their high strength to weight ratio, have been found particularly desirable for use in the aircraft and related industries. Other uses are found in the fields of building construction, home furnishings and supporting equipment.

The thermosetting plastics which are most often employed in the preparation of fibrous glass or asbestos and other inorganic oxide composite articles include the aldehyde condensation resins, the polyester condensation resins, the epoxy resins and the urethane resins. Illustrative of the better known aldehyde condensation resins include the phenol formaldehyde resins, the melamine-formaldehyde resins and the urea-formaldehyde resins, while the better known saturated and unsaturated polyester condensation resins include the glycerol phthalate resins, the glycerol-maleate resins and the glycerol terephthalate resins, as well as their corresponding alcohol-, acid- and oil-modified products. The more widely used epoxy-type resins are those which comprise the glycidyl ethers of polyhydric phenols, such as the diglycidyl ethers of diphenylolmethanes, while the more desirable urethane resins include the adducts of organopolyisocyanates and polyhydric alcohols such as the adduct of para-phenylene diisocyanate and diethylene glycol or glycerol.

In the preparation of composite articles, where thermosetting resinous materials are combined with inorganic oxide materials, it is necessary to achieve a high degree of lasting adhesion between the filler surfaces and the resin if completely satisfactory products are to be obtained. However, because of the basic differences between the inorganic oxide materials and organic resinous materials the bond that is formed therebetween in the preparation of composite articles is weaker than the materials themselves. Failure to achieve a strong adhesion materially detracts from the properties of, and consequently the applications of the product. For example, the strength, the moisture resistance and the useful life of fibrous glass or asbestos reinforced plastics all suffer from weakness of the bond between the reins and the materials.

It was shown that fibrous glass and asbestos as well as other inorganic materials could be more securely bonded to thermosetting resinous materials if they were first sized or finished with compounds which possess a mutual affinity for both the inorganic material and the resin. Composite articles so prepared are of satisfactory strength and, as indicated above, widely employed. The use of such composite articles is however, limited to those applications where strength requirements are not too severe and where exposure to water or high humidity is not encountered. The latter limitation is attributable to the fact that the composite articles are not moisture resistant and consequently when exposed to water or to conditions of high humidity suffer a loss in strength which may run as high as 50 or 60 percent.

Considerable effort has been devoted toward providing fibrous glass or asbestos laminates having a high degree of lasting adhesion between the fiber surfaces and the resin, especially under conditions of high humidity or of water contact. Consequently, numerous suggestions have been made concerning such laminates. For the most part, these suggestions relate to the use of new sizing materials for the inorganic fibrous materials and include the use of liquid monomeric and polymeric organic compositions. Thus far no entirely satisfactory organic sizing composition has been found for this purpose.

The use of organic silicon compounds, such as vinyltrichlorosilane, vinyltrialkoxysilane and the vinylpolysiloxanes, has been suggested for the purpose of sizing fibrous glass materials by reason of the combination of organic and inorganic groups present therein. Such compounds have been found capable of improving the strength of the glass to resin bond of the polyester-type laminates. Moreover, it has been found that the strength of such bond is not materially impaired upon exposure of the laminate to water or to conditions of high humidity. Even though the hereinabove referred to vinyl silicon compounds when applied as sizes remarkably improve the strength characteristics of polyester-type laminates, they have essentially no beneficial effect on the strength characteristics of laminates prepared from fibrous glass materials and other well-known thermosetting resins. For example, there is no essential improvement in the strength or water resistance of the bond of an aldehyde condensation resin, such as melamine-formaldehyde condensation resin, to fibrous glass when a vinyl silicon size of the above type is substituted for a conventional organic size in the preparation of laminates. Likewise, no improvement in the strength or water resistance of such bonds in laminates prepared from epoxy or urethane resins are found when the above vinyl silicon compounds are substituted for conventional organic sizes.

As far as is known the use of vinyltrichlorosilane, vinyltriethoxysilane and the vinylpolysiloxanes as sizes or finishes for asbestos or other inorganic oxide materials employed in conjunction with thermosetting resins has also not met with wide acceptance in the art. According to our experience, treatment of such inorganic oxide fillers, particularly those fillers in particulate or pulverulent form, with the above silicon compounds, prior to the preparation of composite articles, does not materially improve the properties of the final product.

Accordingly, it is an object of the present invention to provide a process for improving the adherence of inorganic oxides as for example fibrous glass, asbestos, mica, quartz, diatomaceous earth and other inorganic oxide materials particularly those materials in particulate or pulverulent form, to thermosetting resins, particularly such thermosetting resins, particularly such thermosetting resins as the aldehyde condensation resins, the epoxy resins and the urethane resins by modifying the surface characteristics of such materials.

We have found that reinforced plastics, such as laminates, prepared from inorganic oxide materials, as for example, glass and asbestos, and thermosetting resins, as for example the aldehyde condensation resins, the epoxy resins and the urethane resins, having a superior filler to resin bond are produced either by subjecting the inorganic oxide materials, prior to the preparation of composite articles as for example prior to lamination, to a teratment with an organosilicon compound containing an aminoalkylsilyl grouping [>N(C$_a$H$_{2a}$)Si≡, where $a$ has the value one or a value of at least three and where the free bonds of the nitrogen atom are taken up by hydrogen, as for example the grouping H$_2$N(C$_a$H$_{2a}$)Si≡, or by the grouping —(C$_a$H$_{2a}$)Si≡], or by forming a mixture of the organosilicon compound with the thermosetting resin and applying the mixture to the inorganic oxide filler materials as in a common laminating procedure. The reinforced plastics prepared by our process are not only characterized by improved mechanical strength and the ability to retain such improved strength upon exposure to conditions of high humidity or water but in addition are further characterized by the relative retention of their mechanical strength at elevated temperatures. If it is preferred to treat the inorganic oxide materials prior to lamination, the treatment may be effected quite simply by immersing an inorganic oxide filler material, such as glass cloth, in a bath of the organosilicon compound and thereafter drying the glass as by air drying.

The organosilicon compounds containing the aminoalkylsilyl grouping which we employ in the process of our invention include the alkoxysilylalkylamines as well as the hydrolysis and cohydrolysis products thereof. Typical of the alkoxysilylalkylamines suitable for use in our process are those compounds represented by the structural formula:

(A) 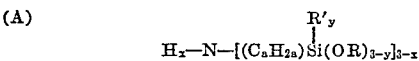

wherein $a$ represents an integer having a value of one or three to ten, inclusive, preferably a value of from three to four, provided that when $a$ has a value from three to ten, the nitrogen atom is separated from the silicon atom by at least three carbon atoms of the C$_a$H$_{2a}$ group, R represents an alkyl group, R' can be either an alkyl group or an aryl group, $y$ is an integer having a value of from zero to one and $x$ has a value of from zero to two. Preferably the R and R' groups contain from one to about twelve carbon atoms. Illustrative of the alkyl groups which R and R' may represent include methyl, ethyl, isooctyl, propyl, dodecyl, and the like, groups, while examples of the aryl groups which R' may represent include phenyl, tolyl, ethylphenyl, diphenyl, naphthyl, and the like. Illustrative of such alkoxysilylalkylamines are trimethoxysilylpropylamine, triethoxysilylmethylamine, triethoxysilylpropylamine, triethoxysilylbutylamine, triethoxysilylisobutylamine, triethoxysilylpentylamine, diethoxymethylsilylpropylamine, diethoxyethylsilylpropylamine, diethoxyphenylsilylpropylamine, tributoxysilylpropylamine, diethoxymethylsilylbutylamine, triethoxysilyldecylamine, diethoxyethylsilylbutylamine, diethoxyphenylsilylbutylamine, bis(triethoxysilylpropyl)amine, bis(diethoxymethylsilylpropyl)amine, bis(triethoxysilylbutyl)amine, tris(triethoxysilylpropyl)amine, and the like.

We can also employ as the sizing or treating compound of our invention polysiloxanes containing the aminoalkylsilyl grouping depicted above. Such polysiloxanes can be prepared by the hydrolysis and condensation of the alkoxysilylalkylamines previously described or by the cohydrolysis and cocondensation of such alkoxysilylalkylamines with other hydrolyzable silanes. Polysiloxanes suitable for use in our process contain the structural unit:

(B) 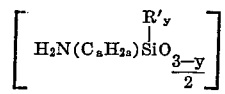

wherein R', $a$ and $y$ have the meanings previously defined with reference to Formula A. Other suitable polysiloxanes are copolymers which contain from 1 to 99 mole percent of units represented by Formula B and from 99 to 1 mole percent of units represented by the formula (C) 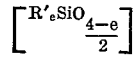

wherein R' has the meaning defined with reference to formula A and $e$ is an integer having a value from one to three, inclusive. A more detailed description of such polymers appears hereinafter.

In the practice of our invention when treating inorganic oxide materials prior to laminating, it is desirable, from an economic and practical standpoint, to effect treatment of the inorganic oxide fillers by immersing them in a solvent solution, preferably a non-flammable solvent solution, of an alkoxysilylalkylamine. Compounds which may be employed as solvents include any organic compound which is a solvent for, but non-reactive with, the alkoxysilylalkylamine as for example the aliphatic oxygen-containing compounds such as the alkanols and the ether-alkanols, examples of which include ethanol, propanol, methoxyethanol, ethoxyethanol, and the like, and the aromatic hydrocarbons such as benzene, toluene, xylene and the like. The preferred solvents are those non-flammable solvents such as water and those aqueous organic admixtures in which the organic constituent is a solvent for, but non-reactive with, the alkoxysilylalkylamine and miscible with sufficient water as to provide a homogeneous mixture therewith. The aqueous organic admixtures can contain, for example, from zero to about 60 parts water and from 100 to 40 parts of an aliphatic oxygen-containing organic compound such as ethanol. An aqueous organic admixture which has been employed with success comprises from about 40 to about 60 parts water and from about 60 to about 40 parts ethanol.

The amount of the alkoxysilylalkylamine present in a solution employed to treat inorganic oxide filler materials is not critical. We have employed solutions containing an alkoxysilylalkylamine in an amount of from as little as 0.05 percent by weight to as much as 2.5 percent by weight. At concentrations below 0.05 percent by weight, the amount of the alkoxysilylalkylamine applied to the filler materials during treatment tends to become insufficient to be entirely effective, and a succession of treatments may be required. Concentrations of the alkoxysilylalkylamine above about 1.2 percent by weight may also be employed; for example, we have employed with good results an alkoxysilylalkylamine in an amount by weight up to its upper limit of solubility. No apparent advantages are obtained by employing a treating bath wherein an alkoxysilylalkylamine is contained in an amount which exceeds its upper limit of solubility.

Solutions prepared by dissolving a trialkoxysilylmethylamine in an aqueous organic admixture are stable for limited periods of time which periods appear to depend upon the concentration of water present. For example, when triethoxysilylmethylamine is placed in water at a concentration of 1 percent, almost immediate gelling occurs. Analysis of the hydrolyzate obtained indicated that it consisted of methylamine, hydrated silica and water. Apparently both the hydrolysis of the ethoxy groups of the triethoxysilylmethylamine and the cleavage of the carbon to silicon bond linking the aminomethyl group to the silicon atom occurred. Such mixtures of the triethoxysilylmethylamine and water are not suitable for use as a sizing medium.

When triethoxysilylmethylamine is placed in an aqueous alcohol admixture, containing 50 percent by weight of water, we find the mixture initially resulting in a milky solution which after a few hours commenced to gel. This solution as hereinbelow shown may be employed as a sizing medium if used before gelling. In an aqueous ethanol admixture containing only a trace of water, triethoxysilylmethylamine is initially soluble and the solution remains stable for longer periods of time as compared to its stability in a solvent containing more water.

According to our studies, when trialkoxysilylmethylamines are dissolved in aqueous organic admixtures, the hydrolysis of the alkoxy groups occurs more rapidly than the cleavage of the carbon to silicon bond. Thus, when such solutions are prepared appreciable amounts of aminomethylpolysiloxane result. However, if the solution be allowed to stand, gelling occurs as a result of the cleavage reaction which produces methyl amine and hydrated silica. We prefer, when employing an aqueous organic admixture as the solvent, to limit the amount of water therein to not more than 60 percent by weight thereof. Such solutions have been found stable for several hours and consequently may be effectively employed.

Bis(trialkoxysilylmethyl)amines, tris(trialkoxysilylmethyl)amines as well as the dialkoxyalkylsilylmethylamines and monoalkoxydialkylsilylmethylamines are not stable in aqueous organic solutions. For example, when bis(triethoxysilylmethyl)amine is placed in aqueous ethanol containing only a trace of water, gelling immediately occurs. Consequently, such compounds are advantageously employed either without a solvent or as solutions with only non-aqueous organic compounds.

When alkoxysilylmethylamines are employed to size fibrous glass materials with the benefit of an organic solvent or without any solvent, we suggest that the coating applied thereto is an aminomethylpolysiloxane. This may be accounted for by the fact that the fibrous glass materials will normally contain sufficient moisture to cause hydrolysis of the readily hydrolyzable alkoxy groups of the monomeric material. The extent of cleavage of the carbon to silicon bond in such instances is not sufficient to be detrimental to the use of such compounds as sizes. As hereinabove indicated the trialkoxysilylmethylamines when dissolved in aqueous organic admixtures hydrolyze to aminomethylpolysiloxanes which are applied as such if employed before gelling.

While the alkoxysilylmethylamines employed in the present invention do not form completely stable solutions with water, we have found that laminates prepared therefrom and fibrous glass materials are not affected by water or by conditions of high humidity.

A preferred class of alkoxysilylmethylamines for use in the present invention are those represented by the formula $H_2NCH_2Si(OR)_3$, where R has the meaning defined hereinabove.

In the practice of our invention we can, as indicated above, form a mixture of an alkoxysilylalkylamine and a thermosetting resin and apply such mixture to the inorganic oxide filler, as in a lamination or other formation procedure, without the necessity of pretreating the filler. This is ordinarily accomplished by adding a solution of the alkoxysilylalkylamine to the thermosetting resin and thoroughly stirring the mixture. The amount of the alkoxysilylalkylamine present in the solution is not narrowly critical and can vary over a wide range. We have found that solutions of the alkoxysilylalkylamine prepared for the purposes of pretreating inorganic fillers prior to lamination, as disclosed above, can be simply added to and admixed with the thermosetting resin employed.

In a like manner, we can size or finish inorganic oxide fillers with solutions of polysiloxanes containing the aminoalkylsilyl grouping or we can form blends or mixtures of such polysiloxanes with thermosetting resins and apply such mixtures to the filler materials as in a lamination or other formation procedure. The amount of such polysiloxanes employed is not narrowly critical and can vary over a wide range. We have found that solutions, blends or mixtures of aminoalkylpolysiloxanes in which the aminoalkylsilyl grouping is present in amounts corresponding to the concentration of such grouping when alkoxysilylalkylamines are employed, are satisfactory.

The thermosetting resins which may be more effectively bonded to inorganic oxide materials by the process of the invention include those resins which contain, before final cure, groups reactive with the amino group of our size. Thus, resins which contain, for example, methylol, epoxy and isocyanate groups may be advantageously employed in our process. Such groups respectively characterize the aldehyde condensation resins, the epoxy resins and the urethane resins. Of particular interest at present are the aldehyde condensation resins which are prepared by the reaction of an aldehyde or of a compound capable upon reaction to yield an aldehyde such as hexamethylenetetramine, with an organic compound to produce methylol-containing derivatives which may be partially condensed to resinous materials. Examples of such aldehyde condensation resins include: the phenol-formaldehyde resins, the phenol-acetaldehyde resins, the phenol furfural resins, the cresol-formaldehyde resins, the urea-formaldehyde resins, the melamine-formaldehyde resins, and the like. Also of considerable interest are the epoxy resins which comprise the diglycidyl ethers of polyhydric phenols as well as blends of such diglycidyl ethers of polyhydric phenols with such modifying ingredients as the polyphenol compounds. Such epoxy resins can be prepared by the reaction of epichlorohydrin with a polyhydric phenol in the presence of a base such as an alkali or alkaline earth metal hydroxide. In the preparation of the epoxy resins various dihydric phenols may be employed to react with epichlorohydrin and they include 2,2-bis(4-hydroxyphenyl) propane, bis(4 - hydroxyphenyl)methane, 1,1-bis(4 - hydroxyphenyl)ethane, 1,1 - bis(4 - hydroxyphenyl)isobutane, 2,2 - bis(4 - hydroxyphenyl)butane, 2,2-bis(4-hydroxy - 2 - methylphenyl)propane, 2,2 - bis(4 - hydroxy - 2 - tertiarybutylphenyl)propane, 2,2 - bis(2 - hydroxynaphthyl)pentane, and the like.

The inorganic oxide materials which can be more effectively bonded to thermosetting resins by the process of the invention include those inorganic oxide fillers generally employed with such resins in the form of fibers, mats, rovings and particulate or pulverulent materials. Of particular importance are the inorganic oxides commonly known as the silicates, aluminates and metal carbonates which include glass, fibrous glass, asbestos, sand, mica, quartz, calcium carbonate, iron oxide, kieselguhr as well as other diatomaceous earths and the like.

Without wishing to be bound by any one particular theory, one possible explanation for the improved inorganic oxide filler to resin bond obtainable by the practice of our invention is that the sizing compounds, namely, those organosilicon compounds which contain the aminoalkylsilyl grouping [$H_2N(C_aH_{2a})Si\equiv$], bind the inorganic oxide filler and resin through chemical linkages. That is, the alkoxysilylalkylamines and aminoalkylpolysiloxanes are, on the one hand, capable of chemically bonding via a Si—O— to M—O— (metal oxide) link to the filler, as, for example, when the filler employed is glass there results an Si—O— to Si—O— link, and, on the other hand, capable of chemically bonding to the resin by virtue of the reaction of its amino groups with the reactive methylol, epoxy or isocyanate groups of the particular resin.

The alkoxysilylalkylamines which we employ in the present invention are characterized by their ability to form stable solutions with aqueous admixtures of organic compounds. Such is particularly desirable from both the economical and practical viewpoints as the necessity of employing pure organic substances as solvents, oftentimes flammable in nature, which mark prior practives is avoided.

When in aqueous solution, the alkoxy groups of the alkoxysilylalkylamines hydrolyze at a slow rate and should such solutions be allowed to stand for a sufficiently long period the alkoxysilylalkylamines are converted to water-soluble aminoalkylpolysiloxanes. Admixtures of such polysiloxanes with aqueous organic compounds or with water are stable and, as indicated above, can be employed as sizes or finishes for inorganic oxide fillers.

The aminoalkylpolysiloxanes which we can employ in our process include polysiloxanes of the cross-linked variety and polysiloxanes of the linear and cyclic variety. Aminoalkylpolysiloxanes of the cross-linked variety are produced by the hydrolysis and condensation of trialkoxysilylalkylamines and can contain small amounts of silicon-bonded hydroxyl or silicon-bonded alkoxy groups depending upon the conditions under which the polymerization is conducted. Such polysiloxanes can be depicted as containing the structural unit:

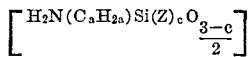

wherein $a$ has the value previously described, Z represents a hydroxyl or alkoxy group and $c$ has an average value of from 0 to 2 and preferably from 0.1 to 1. Typical of such polysiloxanes are gamma-aminopropylpolysiloxane, delta-aminobutylpolysiloxane as well as their corresponding hydroxyl and alkoxy containing polymers.

Aminoalkylpolysiloxanes of the cyclic and linear variety are prepared by the hydrolysis and condensation of dialkoxyalkyl- or dialkoxyarylsilylalkylamines. Such processes result in products which contain both cyclic and linear aminoalkylalkyl- or aminoalkylarylsiloxanes. Polysiloxanes of this variety can be graphically represented by the structural formula:

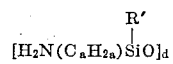

wherein R' and $a$ have the values previously described and $d$ is an integer having a value of at least three and can be as high as seven for the cyclic polysiloxanes and higher for the linear polysiloxanes. Typical of the cyclic siloxanes are the cyclic tetramer of gamma-aminopropylmethylsiloxane and the cyclic tetramer of delta-aminobutylmethylpolysiloxane. Included among the useful linear aminoalkylpolysiloxanes are the hydroxyl, alkoxy and alkyl endblocked polysiloxanes such as the triethoxysilyl endblocked linear gamma-aminopropylmethylpolysiloxane.

We can also employ as our sizing or finishing compounds, copolymeric polysiloxanes containing any of the units depicted above and any of the known hydrocarbon siloxane units. Such copolymers are prepared by the cohydrolysis and cocondensation of alkoxysilylalkylamines and other hydrocarbon substituted alkoxysilanes.

As hereinabove described when alkoxysilylalkylamines are dissolved in water or in aqueous organic compounds, the alkoxy groups hydrolyze and condense while in solution to form soluble aminoalkylpolysiloxanes which may have any of the structures shown above depending on the number of silicon-bonded alkoxy groups present on the starting material. Thus, fibrous glass, glass cloth and other inorganic oxide filler materials which have been treated with such solutions of alkoxysilylalkylamines are sized with the hydrolysis products of the alkoxysilylalkylamines. When bis-, or tris(alkoxysilylalkyl)amines are employed in admixture with water or with aqueous organic compounds, such silanes also hydrolyze and condense to polymers having structures somewhat similar to those depicted above.

In accordance with our invention, organosilicon compounds containing the aminoalkylsilyl grouping can be applied as a size or finish to inorganic oxide materials without the benefit of an aqueous solvent, as for example, with the aid of a non-aqueous solvent. According to our belief inorganic oxide materials, such as fibrous glass, normally contain sufficient moisture to cause formation of chemical bonds between such fillers and our sizing compounds.

The alkoxysilylalkylamines which we employ in the process of our invention can be prepared by the hydrogenation of cyanoalkylalkoxysilanes in which the cyano group is removed by at least two carbon atoms from the silicon atom of the compound. Such process is disclosed and claimed in United States Patent No. 2,930,809. Also disclosed and claimed in United States Patent No. 2,930,809 are the alkoxysilylbutylamines. The alkoxysilylalkylamines, the aminoalkylpolysiloxanes and processes for preparing them are disclosed in United States patent applications Ser. Nos. 615,481 and 615,483, both now abandoned, and in United States Patent No. 2,947,771.

The alkoxysilylpropylamines and gamma-aminopropylpolysiloxanes as well as copolymers thereof are disclosed and claimed in United States Patent No. 2,832,754. Also disclosed and claimed in United States Patent No. 2,832,754 are processes for their preparation.

The alkoxysilylmethylamines which we employ in the process of our invention are prepared by the reaction of ammonia with a chloromethylalkoxysilane under pressure and at an elevated temperature. The products of such reaction include in addition to mono(alkoxysilylmethyl)amine, bis(alkoxysilylmethyl)amine and tris(alkoxysilylmethyl)amine. For example, when chloromethyldimethoxymethylsilane is reacted with ammonia there is produced dimethoxymethylsilylmethylamine, bis(dimethoxymethylsilylmethyl)amine and tris(dimethoxymethylsilylmethyl)amine.

In the practice of our process, wherein the inorganic oxide filler is treated prior to lamination with a treating bath, the filler, as for example, glass cloth, is saturated with the treating solution, as by immersion in a bath, in order that the silicon compound will be picked up by the fiber. After removal of the glass fiber material from the bath, the excess solvent is removed by known expedients such as by air drying. Thereafter composite articles, such as laminates or any other reinforced plastic products, can then be prepared from the sized cloth using known procedures and standard techniques. If desired, the treated glass cloth after removal of the solvent as by air drying, can be heated to cure the size.

The following examples are illustrative of the invention.

Example 1

A No. 181 glass cloth (a satin weave glass cloth having a thickness of 10 mils, weighing about 8.9 ounces per square yard, having 57 by 54 ends and picks per square inch and a breaking strength of 375 by 350 pounds per square inch), which had previously been subjected to heat cleaning, was immersed in a solution consisting of equal parts by weight of water and ethanol and containing 1.2 percent by weight of triethoxysilylpropylamine. After removal from solution, the glass cloth was drained and air dried at room temperature to remove the solvent therefrom. The amount by weight of the size contained by the glass cloth when calculated in terms of percent by weight thereof of aminopropylpolysiloxane was 0.83 percent (based on analytical data for combustible carbon on the sized cloth).

Laminates were prepared from a portion of the treated glass cloth by laying up, in accordance with customary practices, alternating layers of the cloth and a commercial melaminealdehyde condensation polymer ("Melmac–405", a melamine resin sold by the American Cyanamid Company), which resin was employed as a solution containing 50 percent solids by weight in a solvent consisting of 95 parts water and 5 parts butanol. The laminates thus laid up were precured at a temperature of about 125° C. for a period of about five minutes in accordance with the manufacturer's recommendations. They were then subjected to a final curing treatment at a temperature of 150° C. for a period of about ten minutes in a hydraulic press at a pressure of 1000 pounds per square inch. The laminates comprised 13 plies and had a cured thickness of from 0.102 inch to 0.110 inch. It was calculated that the cured laminates contained about 45 percent by weight therof of the melamine resin.

The laminates were evaluated by conducting tests of flexural strength on specimens cut from the material, one test being conducted on the material as cured and a second on a specimen that was subjected to boiling tap water for a period of two hours, cooled to room temperature in water and then tested wet. The flexural tests were carried out as described in Air Force Specification MILP–8013 (also Federal Specification LP–406a Method No. 1031). These tests were conducted by placing a specimen one inch by four inches on standardized supports, two inches apart, and the specimen then broken by a load applied midway between the two supports.

Similar dry and wet tests were conducted on nonsized glass cloth "Melmac 405" laminates of 13 ply. These laminates were of approximately the same thickness as those prepared from the sized glass cloth. The comparative results of the flexural tests appear in the table below.

TABLE 1.—FLEXURAL STRENGTH

| | Dry, p.s.i. | Wet, p.s.i. | Percent Retention |
|---|---|---|---|
| Non-sized glass cloth laminate | 24,400 | 13,800 | 56.5 |
| Sized glass cloth laminate (glass cloth treated with a solution of triethoxysilylpropylamine) | 80,000 | 76,500 | 95.8 |

Example 2

The remaining portion of the sized glass cloth prepared in Example 1 was employed to prepare 13 ply laminates by plying layers of the cloth and a commercial melaminealdehyde condensation polymer (Resimene 814, a melamine resin sold by the Monsanto Chemical Company), which resin was employed as a solution containing 50 percent solids by weight in a solvent consisting of 95 parts water and 5 parts butanol. Laminates of 13 ply were also prepared from non-sized glass cloth and the commercial melaminealdehyde condensation polymer. The method employed to prepare such laminates and the flexural strength tests conducted thereon were the same as disclosed in Example 1. The comparative data obtained are reported below.

TABLE 2.—FLEXURAL STRENGTH

| | Dry, p.s.i. | Wet, p.s.i. |
|---|---|---|
| Non-sized glass cloth laminate | 23,000 | 28,750 |
| Sized glass cloth laminate (glass cloth treated with a solution of triethoxysilylpropylamine) | 79,000 | 74,000 |

Example 3

A No. 181 glass cloth, which had previously been subjected to heat cleaning, was immersed in a solution consisting of equal parts by weight of water and ethanol and containing 1.2 percent by weight of bis(triethoxysilylpropyl)amine. After removal from solution, the glass cloth was drained and air dried at room temperature to remove the solvent therefrom. The amount of the size contained by the glass cloth when calculated in terms of percent by weight thereof of aminopropylpolysiloxane was 0.65 percent.

Laminates were prepared from the sized glass cloth and a commercial melaminealdehyde condensation polymer ("Melmac 405," a melamine resin sold by the American Cyanamid Company). Laminates were also prepared from non-sized glass cloth and the commercial condesation polymer. The laminates were prepared and tested for flexural strength in the manner disclosed in Example 1. The following results were obtained:

TABLE 3.—FLEXURAL STRENGTH

| | Dry, p.s.i. | Wet, p.s.i. | Percent Retention |
|---|---|---|---|
| Non-sized glass cloth laminate | 24,400 | 13,800 | 56.5 |
| Sized glass cloth laminate [glass cloth treated with a solution of bis(triethoxysilylpropyl)amine] | 73,500 | 75,500 | 102 |

Example 4

A No. 181 glass cloth, which had previously been subjected to heat cleansing, was immersed in a solution consisting of equal parts by weight of water and ethanol and containing 1.2 percent by weight of tris(triethoxysilylpropyl)amine. After removal from solution the glass cloth was drained and air dried at room temperature to remove the solvent therefrom. The amount by weight of the size contained by the glass cloth when calculated in terms of percent by weight thereof of aminopropylpolysiloxane is 1.01 percent.

Laminates were prepared from the sized glass cloth and a commercial melaminealdehyde condensation polymer ("Melmac 405," a melamine resin sold by the American Cyanamid Company). Laminates were also prepared from non-sized glass cloth and the commercial condensation polymer. The laminates were prepared and tested for flexural strength in the manner as disclosed in Example 1. The following results were obtained:

TABLE 4.—FLEXURAL STRENGTH

| | Dry, p.s.i. | Wet, p.s.i. | Percent Retention |
|---|---|---|---|
| Non-sized glass cloth laminate | 24,400 | 13,800 | 56.5 |
| Sized glass cloth laminate [glass cloth treated with a solution of tris(triethoxysilylpropyl)amine] | 47,300 | 45,800 | 97.1 |

Example 5

A No. 181 glass cloth, which had previously been subjected to heat cleansing, was immersed in a solution consisting of equal parts by weight of water and ethanol and containing 1.2 percent by weight of triethoxysilylpropylamine. After removal from solution the glass cloth was drained and air dried at room temperature to remove the solvent therefrom. The amount by weight of the size contained by the glass cloth when calculated in terms of percent by weight thereof of aminopropylpolysiloxane is 0.40 percent.

Laminates were prepared from the treated glass cloth by laying alternating layers of a cloth in a hexamethylenetetramaine modified commercial phenol-formaldehyde polymer (100 parts of Bakelite "BV 17085," a phenolic bonding resin sold by the Bakelite Company, a division of Union Carbide Corporation, modified with 1.5 parts hexamethylenetetramine), which resin was employed in a solution containing 50 percent solids by weight in a solvent consisting of 95 parts water and 5 parts butanol. These laminates were prepared by the methods recommended by the resin manufacturer. It was calculated that the cured laminates contained about 33 percent by weight thereof of the phenol-formaldehyde resin.

Laminates were also prepared from non-sized glass cloth and the phenol-formaldehyde condensation polymer as well as from the polymer and glass cloth sized with "Volan A" (a commercially available organic size, sold by the Du Pont Company). All of the prepared laminates were of similar dimensions. The sized and non-sized glass cloth laminates were tested for flexural strength in the manner disclosed in Example 1 and the comparative data obtained therefrom appears in the table below.

TABLE 5.—TENSILE STRENGTH (P.S.I. DRY)

Laminate
- Control, no size _____ 32,000
- "Volan A" (a commercial non-siloxane size) _____ 45,000
- Solution of triethoxysilylpropylamine as size _____ 50,000

From the above examples it is readily apparent that greatly improved glass to resin bonds are obtained in composite articles prepared from fibrous glass materials and thermosetting resins containing groups reactive with the amino group alkoxysilylpropylamine.

The polymeric nature of the hydrolyzed alkoxysilylpropylamines which form when aqueous solutions thereof are prepared is illustrated by Example 6.

Example 6

To a flask containing 100 grams of triethoxysilylpropylamine was slowly added 300 grams of distilled water. During the addition of the water the solution became cloudy and had the appearance of an oil emulsion. After the addition of all the water the solution was boiled under reflux during which time, one-half hour, the solution became homogeneous. During the course of reflux ethanol was fractionally distilled off and the water present in the mixture evaporated under reduced pressure. There was obtained a clear glassy material which readily dissolved in water.

In an additional experiment the above procedure was followed with the exception that after the theoretical amount of alcohol resulting from hydrolysis and condensation was recovered from the hydrolysis step the resulting compound was dried and a solid brittle mass obtained. This solid was ground to a fine powder, dried under reduced pressure for several hours and analyzed. The following results were obtained:

TABLE 6

| | Si, percent | N, percent |
|---|---|---|
| Calcd. for $NH_2C_3H_8SiO_{3/2}$ | 25.5 | 12.7 |
| Found | 24.3 | 12.0 |

The aminopropylpolysiloxane obtained was then dissolved in water and a clear solution obtained. This solution was stored for several weeks at room temperature without change after which time it was effectively employed as a sizing material for glass cloth. Atmospheric distillation of a weakly basic solution of the polymer gave a neutral distillate showing that no propylamine was formed by decomposition of the aminopropylpolysiloxane.

Example 7

A No. 181 glass cloth, which had previously been subjected to heat cleansing, was passed through a dip tank containing a solution consisting of equal parts by weight of water and ethanol and 1.2 percent by weight of triethoxysilylpropylamine. After passage through the tank the glass cloth was directed over a wiping bar which served to remove the excess solution therefrom. The glass cloth was then air dried at a temperature of from about 152° C. to 154° C. for approximately ten minutes. The amount by weight of the size contained by the glass cloth when calculated in terms of percent by weight thereof aminopropylpolysiloxane was from about 0.3 to about 0.5 percent.

The sized glass cloth was then impregnated with a commercial epoxy resin (a blend of about 70 parts by weight of the diglycidyl ethers of the 2,2-, 2,4- and 4,4-dihydroxydiphenylmethanes and about 30 parts by weight of a mixture of the 2,2-, 2,4- and 4,4-dihydroxydiphenyl and having a curing temperature, when treated with a potassium hydroxide catalyst, of 160° C.), which resin was employed in a solution consisting of about 65 percent by weight of the resin in acetone. The impregnated glass cloth was then dried at 147° C. for about six minutes to remove the solvent and other volatile materials. It was found that the impregnated glass cloth contained about 37 percent by weight thereof of the epoxy resin.

Laminates were prepared from the impregnated glass cloth by pressing twelve sheets of cloth (12 inches square) at 160° C. under a pressure of 225 pounds per square inch for a period of one hour. After such pressing the laminates were baked for eight hours at a temperature of 160° C. Additional laminates of the same size were also prepared in accordance with the above procedure with exception that the glass cloth was sized with "Volan A" (a commercially available organic size, sold by the Du Pont Company). A series of tests were conducted on the laminates for flexural strength, tensile strength, and compressive strength. The flexural strength tests were conducted in accordance with ASTM Specification D790–49–T and the tensile strength tests were conducted in accordance with ASTM Specification 6882–52–T, while the compressive strength tests were conducted in accordance with the Air Force Specification MIL–R–7575. The data obtained appear in the table below.

TABLE 7

| | Laminates prepared from epoxy resin and glass cloth sized with solution of triethoxysilylpropylamine | Laminates prepared from epoxy resin and glass cloth sized with solution of "Volan A" |
|---|---|---|
| Flexural strength, p.s.i. at 23° C | 101,000 | 80,000–85,000 |
| Flexural strength, p.s.i. at 71° C | 83,200 | 53,000–63,000 |
| Flexural modulus, p.s.i.×10⁶ at 23° C | 5.7 | 4.0–4.5 |
| Flexural modulus, p.s.i.×10⁶ at 71° C | 4.98 | 3.0–3.4 |
| Flexural strength, p.s.i. at 200° F. after exposure for one-half hour in an air oven at 200° F | 40,000 | 11,000 |
| After two hours immersion in boiling water: | | |
| Flexural strength, p.s.i. at 23° C | 94,500 | 72,000–80,000 |
| Flexural modulus, p.s.i.×10⁶ at 23° C | 5.4 | 3.7–4.3 |
| Tensile strength, p.s.i. | 63,000 | 55,000–60,000 |
| Tensile modulus, p.s.i.×10⁶ | 4.76 | 4.0–4.8 |
| Compressive strength, p.s.i. | 55,000 | 50,000–60,000 |
| Compressive modulus, p.s.i. at 10⁶ | 7.21 | 4.0–6.0 |
| Izod notched impact strength, ft. lbs./inch | 19 | 11–13 |

As may be seen from the above table, the general mechanical strength of those laminates prepared from glass cloth sized with an alkoxysilylpropylamine is significantly superior to the general mechanical strength of those laminates prepared from glass cloth sized with "Volan A." A particularly noteworthy property of the alkoxysilylpropylamine-sized glass cloth laminates is their relative retention of strength at elevated temperatures. For example, as disclosed in the above table, the triethoxysilylpropylamine-sized glass cloth laminates have a flexural strength at 200° F., after exposure for one-half hour in an air oven at a temperature of 200° F., of 40,000 pounds per square inch, while the "Volan A"-sized glass cloth laminates when tested under the same conditions and after the same treatment had a flexural strength of only 11,000 pounds per square inch.

Example 8

The epoxy resin employed in the previous example was blended with bis(aminophenylmethane) (a hardening agent) in a ratio of 100 parts by weight of the resin to 28.5 parts by weight of the hardening agent, and the blend employed to prepare laminates from No. 181, heat cleansed, glass cloth sized with a solution of triethoxysilylpropylamine (as prepared in the previous example) and from glass cloth of the same size, sized with "Volan A."

The method employed to prepare such laminates was identical to that described in the previous example and the tests conducted thereon were also identical with those described in said example. It was noted that the glass cloth sized with the solution of triethoxysilylpropylamine contained about 0.4 percent by weight thereof of aminopropylpolysiloxane and that the glass cloth when impregnated with the epoxy resin contained about 37 percent by weight of the resin. The data obtained appear in the table below.

TABLE 8

| | Laminates prepared from modified epoxy resin and glass cloth sized with a solution of triethoxysilylpropylamine | Laminates prepared from modified epoxy resin and glass cloth sized with "Volan A" |
|---|---|---|
| Flexural strength, p.s.i. at 23° C | 71,000 | 60,000 |
| Flexural strength, p.s.i. at 71° C | 61,700 | 55,000 |
| Flexural modulus, p.s.i.×$10^6$ at 23° C | 3.84 | 3.0–3.7 |
| Flexural modulus, p.s.i.×$10^6$ at 71° C | 3.30 | 2.9 |
| After 2 hours immersion in boiling water: | | |
| Flexural strength, p.s.i. at 23° C | 62,000 | 60,000 |
| Flexural modulus, p.s.i.×$10^6$ at 23° C | 3.64 | 2.8 |
| Tensile strength, p.s.i. | 45,000 | 45,000 |
| Tensile modulus, p.s.i.×$10^6$ | 3.3 | 2.8 |
| Compressive strength, p.s.i. | 59,000 | 48,000 |
| Compressive modulus, p.s.i.×$10^6$ | 4.35 | 3.3 |

The sized glass cloth was then cut into several lengths and the lengths impregnated with a hexamethylenetetraamine modified commercial phenol-formaldehyde polymer (100 parts of Bakelite "BV 17085" a phenolic one-step bonding resin having a high content of methylol groups modified with 1.5 parts of hexamethylenetetraamine). The lengths of impregnated glass cloth were then air dried at a temperature of about 130° C. for periods of time which varied from three to six minutes to remove the solvent and other volatile materials. The various impregnated glass cloths were found to contain from about 27 to 30 percent by weight thereof of the phenolic resin.

A number of 14 ply laminates were prepared from the impregnated glass cloths by pressing sheets of the cloth in a hydraulic press at a temperature of from about 160° C. to 165° C. The pressures employed and periods of time during which such pressures were exerted in the preparation of the laminates varied. That is, some laminates were prepared at pressures which were as low as 50 pounds per square inch and others at pressures as high as 300 pounds per square inch, while the periods during such pressures were exerted varied from as little as fifteen minutes to as much as fifty minutes.

Additional 14 ply laminates were prepared in accordance with the above procedures with the exception that the size employed as "Volan A." A series of tests were conducted on the prepared laminates to determine tensile strength, flexural strength and edgewise compressive strength. These tests were conducted in accordance with Air Force Specification MIL-R-9299 (Class II), for high temperature laminates. The results obtained appear in the table below and represent an average range of strengths from tests on twenty-five specimens. Also appearing in the table below are the required tensile strength, flexural strength and edgewise compressive strength values of the above Air Force specification.

TABLE 9

| | Specified by MIL-R-9299 (Class II) | Laminates prepared employing glass cloth sized with "Volan A" (average values) | Laminates prepared employing glass cloth sized with triethoxysilylpropylamine (average values) |
|---|---|---|---|
| Flexural strength, p.s.i. | | | |
| At room temp | 50,000 | 50,000–64,000 | 68,000–90,000 |
| At 500° F. after ½ hr. at 500° F. (air oven) | 40,000 | 25,000–44,000 | 40,000–65,000 |
| At 500° F. after 100 hrs. at 500° F. (air oven) | 20,000 | 10,000–18,000 | 20,000–50,000 |
| Edgewise compressive strength, p.s.i.: | | | |
| At room temp | 35,000 | 40,000–55,000 | 40,000–60,000 |
| At 500° F. after ½ hr. at 500° F. (air oven) | 30,000 | 23,000–33,000 | 30,000–45,000 |
| Tensile strength p.s.i.: | | | |
| At room temp | 40,000 | 18,000–40,000 | 40,000–55,000 |
| At 500° F. after ½ hr. at 500° F. (air oven) | 30,000 | 16,000–30,000 | 30,000–45,000 |

Example 9

A No. 181 glass cloth, which had previously been subjected to heat cleansing was passed through a dip tank containing a solution consisting of equal parts by weight of water and ethanol and 1.2 percent by weight of triethoxysilylpropylamine. After passage through the tank, the glass cloth was directed over a wiping bar which served to remove the excess solution therefrom. The glass cloth was then air dried at a temperature of about 125° C. for approximately three minutes.

Example 10

Following the same procedure disclosed in Example 9, laminates were prepared from heat-cleansed glass cloth which had been treated with a water-ethanol solution containing 1.2 percent by weight of triethoxysilylbutylamine and a hexamethylenetetramine modified commercial phenol-formaldehyde resin (same as in Example 9). The laminates were tested for flexural and tensile strengths in accordance with Air Force Specification MIL-R-9299 (Class II) for high temperature laminates. The data obtained appear in the table below and represent an average value of the strengths obtained from a number of specimens. Also appearing in the table below are the required tensile strength and flexural strength values of the above Air Force Specification.

TABLE 10

| Flexural strength, p.s.i. | Specified by MIL-R-9299 (Class II) | Laminates prepared from glass cloth sized with triethoxysilylbutylamine (average values) |
|---|---|---|
| At room temp | 50,000 | 59,500 |
| At 500° F. after 100 hrs. at 500° F. (air oven) | 20,000 | 55,000 |
| Tensile strength, p.s.i.: | | |
| At room temp | 40,000 | 41,000 |
| At 500° F. after ½ hr. at 500° F. (air oven) | 30,000 | 38,000 |

Example 11

A No. 181 glass cloth, which had previously been subjected to heat cleansing, was immersed in a solution consisting of equal parts by weight of water and ethanol and containing 1.2 percent by weight of triethoxysilylbutylamine. After removal from the solution, the glass cloth was dried and laminates (13 ply) were prepared from such cloth in combination with a commercial melaminealdehyde condensation polymer ("Melmac–405") in accordance with the procedure described in Example 1. The laminate was tested for its flexural strength in accordance with Air Force Specification MILP–8013 (described in Example 1) and the data (average values for four laminates) obtained listed below and compared with the corresponding values for the laminate prepared in the same manner with unsized glass cloth. Also tested were laminates prepared in accordance with the same procedure with the exception that the heat cleansed glass cloth was treated with 1.2 percent solutions of (a) bis(triethoxysilylbutyl)amine (b) tris(triethoxysilylbutyl)amine, (c) diethoxymethylsilylbutylamine, and (d) diethoxymethylsilylpropylamine, in a water-ethanol mixture.

TABLE 11.—FLEXURAL STRENGTH

| | Dry, p.s.i. | Wet, p.s.i. | Percent Retention |
|---|---|---|---|
| Non-sized glass cloth laminate | 28,400 | 13,900 | 56.5 |
| Sized glass cloth laminate (glass cloth treated with a solution of triethoxysilylbutylamine) | 90,350 | 89,875 | 99 |
| Sized glass cloth laminate [glass cloth treated with a solution of bis(triethoxysilylbutyl) amine] | 42,575 | 48,125 | |

Example 12

A No. 181 glass cloth, which had previously been subjected to heat cleansing, was immersed in a solution consisting of equal parts by weight of water and ethanol and containing 1.2 percent by weight of triethoxysilylpentylamine. After removal from the solution, the glass cloth was drained and was air dried to remove the solvent therefrom. Laminates were prepared from the treated glass cloth and from untreated glass cloth with a melaminealdehyde condensation polymer ("Melmac–405") and the laminates tested, all in accordance with the procedure disclosed in Example 1. The data appears in table below.

TABLE 12.—FLEXURAL STRENGTH

| | Dry, p.s.i. | Wet p.s.i. |
|---|---|---|
| Non-sized glass cloth laminate | 25,000 | 14,000 |
| Sized glass cloth laminate (glass cloth treated with a solution of triethoxysilylpentylamine) | 57,000 | 51,000 |

Example 13

A No. 181 glass cloth, which had previously been subjected to heat cleansing, was immersed in a solution consisting of equal parts by weight of water and ethanol and containing 1.2 percent by weight of the aqueous admixture of triethoxysilylmethylamine. After removal from solution, the glass cloth was drained and air dried at room temperature to remove the solvent therefrom. The amount by weight of the size contained by the glass cloth when calculated in terms of percent by weight of aminomethylpolysiloxane was 0.48 percent (based on analytical data for combustible carbon on the sized cloth).

Laminates were prepared from a portion of the treated glass cloth by laying up, in accordance with customary practices, alternating layers of the cloth and a commercial melaminealdehyde condensation polymer ("Melmac–405" a melamine resin sold by the American Cyanamid Company), which resin was employed as a solution containing 50 percent solids by weight in a solvent consisting of 95 parts water and 5 parts butanol. The laminates thus laid up were precured at a temperature of about 125° C. for a period of about five minutes in accordance with the manufacturer's recommendations. They were then subjected to a final curing treatment at a temperature of 150° C. for a period of ten minutes in a hydraulic press at a pressure of 1000 pounds per square inch. The laminates comprised 13 plies and had a cured thickness of from 0.102 inch to 0.110 inch. It was calculated that the cured laminates contained about 45 percent by weight thereof of the melamine resin.

The laminates were evaluated by conducting tests of flexural strength on specimens cut from the material, one test being conducted on the material as cured and a second on a specimen that was subjected to boiling tap water for a period of two hours, cooled to room temperature in water and then tested wet. The flexural tests were carried out as described in Air Force Specification MILP–8013 (also Federal Specification LP–406a Method No. 1031). These tests were conducted by placing a specimen one inch by four inches on standardized supports, two inches apart, and the specimen then broken by a load applied midway between the two supports.

Similar dry and wet tests were conducted on non-sized glass cloth "Melmac–405" laminates of 13 ply. These laminates were of approximately the same thickness as those prepared from the sized cloth. The comparative results of the flexural tests appear in the table below.

TABLE 13.—FLEXURAL STRENGTH

| | Dry, p.s.i. | Wet, p.s.i. | Percent retention |
|---|---|---|---|
| Non-sized glass cloth laminate | 24,000 | 13,800 | 56.5 |
| Sized glass cloth laminate (treated with solution of triethoxysilylmethylamine) | 66,500 | 66,500 | 100 |

Example 14

A No. 181 glass cloth, which had previously been subjected to heat cleansing, was immersed in a solution consisting of 1.1 percent by weight of bis(triethoxysilylmethyl)amine in ethanol. After removal from solution, the glass cloth was drained and air dried at room temperature to remove the solvent therefrom. The amount by weight of the size contained by the glass cloth when calculated in terms of percent by weight thereof of aminomethylpolysiloxane was .34 percent (based on analytical data for combustible carbon on the sized cloth).

Laminates were prepared from the sized glass cloth as well as from non-sized glass cloth and a commercial melaminealdehyde condensation polymer ("Melmac–405") in a manner similar to that disclosed in the previous examples. Evaluation of the prepared laminates was also conducted in a manner identical to that disclosed in the previous example. The data obtained appears in in the table below.

TABLE 14.—FLEXURAL STRENGTH

| | Dry, p.s.i. | Net, p.s.i. | Percent retention |
|---|---|---|---|
| Non-sized glass cloth laminate | 24,000 | 13,800 | 56.5 |
| Sized glass cloth laminate [treated with solution of bis(triethoxysilylmethyl)amine] | 38,500 | 31,600 | 82.2 |

Example 15

Calcined clay (883 grams) of an average particle size of 0.29 micron was treated with a solution comprising 1.76 grams of triethoxysilylpropylamine and 3000 milliliters of benzene. In a like manner, 883 grams of finely-powdered mica (160 to 200 mesh) were also treated with an identical solution. After the treatments, the materials were washed with petroleum ether and air dried. The treated particles were then employed as fillers in the production of phenol-formaldehyde resin reinforced plastics. On testing, it was noted that the reinforced resins containing the treated particles possessed superior strength characteristics than reinforced resins containing the same, but untreated, particles.

Example 16

Finely-divided silica was treated with a water-ethanol solution of triethoxysilylpropylamine. After the treatment, the treated silica was dried analyzed to determine the amount of triethoxysilylpropylamine picked up thereby. The amount of the size contained by the treated silica when calculated in terms of percent by weight thereof of triethoxysilylpropylamine was about 3.5 percent. A reinforced plastic prepared from the treated silica and a phenol-formaldehyde resin is characterized by superior strength characteristics as compared with an identical reinforced plastic employing untreated silica.

Example 17

A solution comprising 2.5 grams of n-butanol, 46.3 grams of water and 1.2 grams of triethoxysilylpropylamine was prepared and slowly added with stirring to 50 grams of a melaminealdehyde condensation polymer ("Melmac–405"). A No. 181 glass cloth, which had previously been subjected to heat cleansing was immersed in the mixture, removed therefrom and precured by subjecting it to a temperature of 125° C. for a period of five minutes. The glass cloth was then laid up into 13 plys and cured by subjecting the laid-up cloth to a temperature of 300° F., under a pressure of 1000 p.s.i., for a period of ten minutes.

A second laminate was prepared in a manner similar to that above with the exception that the water-butanol solution contained only 0.1 gram of triethoxysilylpropylamine dissolved therein. A third laminate was also prepared in the same manner with the exception that the laminating resin was free of triethoxysilylpropylamine. The laminates so prepared were tested for flexural strength as in Example 1 and the data obtained listed in the table below.

| Laminate | Flexural strength | | |
| --- | --- | --- | --- |
|  | Dry, p.s.i. | Net, p.s.i. | Percent retention |
| (1) Prepared from glass cloth and mixture of 1.2 grams of triethoxysilylpropylamine and resin | 75,000 | 73,000 | 98 |
| (2) Prepared from glass cloth and mixture of 0.1 gram of triethoxysilylpropylamine and resin | 69,500 | 71,000 | 102 |
| (3) Prepared from glass cloth and resin alone | 28,400 | 13,900 | 49 |

Example 18

A partially heat-cleansed glass cloth (commonly known as "carmelized" glass cloth), which still retained some of the starch-oil size usually applied by the manufacturer, was cut into four 6 inch by 49 inch strips. One of the strips was hand dipped into a water solution containing 1.2 percent by weight of triethoxysilylpropylamine, a second strip dipped into a water solution containing 1.8 percent by weight of the same silane and the third strip into a water solution containing 2.4 percent by weight of the same silane. After dipping, the glass cloths were air dried for two hours and then together with the fourth strip dipped into a solution comprising 50 grams of a melamine resin ("Melmac–405"), 2.5 grams n-butanol and 47.5 grams water. The coated glass cloths were then precured by subjecting them to a temperature of 125° C. for a period of five minutes. Each strip was laid up into a 13 ply laminate and cured by subjecting the laid-up strips to a pressure of 1000 p.s.i. at a temperature of 300° F. for a period of ten minutes. Specimens (1 inch x 4 inches) were obtained from each of the laminates and tested for flexural strength as described in Example 1.

| Laminates, concentration of triethoxysilylpropylamine solution, percent | Flexural strength | | |
| --- | --- | --- | --- |
|  | Dry, p.s.i. | Wet, p.s.i. | Percent retention |
| 1.2 | 100,000 | 96,000 | 96 |
| 1.8 | 85,400 | 83,300 | 97.6 |
| 2.4 | 98,800 | 84,300 | 85.4 |
| 0 | 37,250 | 33,250 | 89 |

Example 19

Asbestos paper was immersed in a water-ethanol solution containing 0.7 percent by weight of triethoxysilylpropylamine. After immersion the asbestos paper was air dried and laminates (30 ply, total thickness about 3/8 inch) prepared therefrom in combination with a phenol-formaldehyde condensation resin comprising a mixture of (1) 75 parts of a low molecular weight phenol-formaldehyde resin, (2) 25 parts of phenol-formaldehyde resin rich in methylol groups, and (3) 1 part of hexamethylenetetramine. Identical laminates were prepared from non-sized asbestos paper and they as well as the laminates prepared above were tested for flexural strength at room temperature and at room temperature as well as at 500° F. after being subjected to a temperature of 500° F. for periods of twenty-four and one hundred hours.

|  | Laminates prepared from non-sized asbestos paper | Laminates prepared from asbestos sized with triethoxysilylpropylamine |
| --- | --- | --- |
| Flexural strength (p.s.i.) at room temperature | 56,600 | 62,700 |
| Flexural strength (p.s.i.), at room temperature after 100 hrs. at 500° F | 48,200 | 60,700 |
| Flexural strength (p.s.i.), at 500° F. after 24 hrs. at 500° F | 29,100 | 37,000 |
| Flexural strength (p.s.i.), at 500° F. after 100 hrs. at 500° F | 28,600 | 32,800 |

What is claimed is:

1. Process of treating inorganic oxide substrates to improve the bonding thereto of thermosetting resins which comprises providing an aminoalkyltrialkoxy silane in admixture with water and effecting hydrolysis and condensation of said silane to produce siloxane therefrom containing silicon atoms thereof bonded to other silicon atoms thereof through an oxygen atom, providing said admixture on the surface of said substrate, and essentially removing said water to provide a condensed aminoalkyl siloxane coating on said surface thereby providing amino groups on said surface which are reactive with thermosetting resins, said aminoalkyl moieties of said silane and siloxanes contain at least three carbon atoms in sequential order separating the amino nitrogen attached to said carbon atoms from the silicon atom to which one of said carbon atoms are directly bonded, and said alkoxy group contains from 1 to 12 carbon atoms.

2. The process of claim 1 wherein the aminoalkyltrialkoxy silane is gamma-aminopropyltriethoxysilane.

3. The process of claim 1 wherein the coated inorganic oxide surface is provided with a thermosetting resin in contact therewith.

4. The process of claim 1 wherein the inorganic oxide substrate is glass fiber.

5. The process of claim 1 wherein the inorganic oxide substrate is particulate.

6. The process of claim 2 wherein the inorganic substrate is fiber glass.

7. The process of claim 2 wherein the inorganic substrate is particulate.

References Cited

UNITED STATES PATENTS

| 2,541,896 | 2/1961 | Vasileft | 117—126 X |
| 2,563,288 | 8/1961 | Steinman | 117—126 |
| 3,341,456 | 9/1967 | Collier | 117—126 |

RALPH S. KENDALL, Primary Examiner

U.S. Cl. X.R.

106—308; 117—76, 100, 123, 126, 161